(12) United States Patent
Zhang

(10) Patent No.: US 12,010,219 B2
(45) Date of Patent: Jun. 11, 2024

(54) KEY MANAGEMENT PROVIDING HIGH AVAILABILITY WITHOUT KEY REPLICATION

(71) Applicant: Salesforce, Inc., San Francisco, CA (US)

(72) Inventor: Lionel L Zhang, Bellevue, WA (US)

(73) Assignee: Salesforce, Inc., San Francisco, CA (US)

( * ) Notice: Subject to any disclaimer, the term of this patent is extended or adjusted under 35 U.S.C. 154(b) by 332 days.

(21) Appl. No.: 17/510,225

(22) Filed: Oct. 25, 2021

(65) Prior Publication Data

US 2023/0130457 A1 Apr. 27, 2023

(51) Int. Cl.
*H04L 9/08* (2006.01)
*H04L 9/12* (2006.01)
*H04L 9/32* (2006.01)

(52) U.S. Cl.
CPC ............ *H04L 9/083* (2013.01); *H04L 9/0825* (2013.01); *H04L 9/0841* (2013.01); *H04L 9/0861* (2013.01); *H04L 9/0894* (2013.01); *H04L 9/3247* (2013.01)

(58) Field of Classification Search
CPC ..... H04L 9/083; H04L 9/0825; H04L 9/0841; H04L 9/0861; H04L 9/0894; H04L 9/3247
USPC .......................................................... 380/282
See application file for complete search history.

(56) References Cited

U.S. PATENT DOCUMENTS

| | | | |
|---|---|---|---|
| 9,288,059 B2 * | 3/2016 | Nix .......................... | G06F 21/35 |
| 9,954,680 B1 * | 4/2018 | Machani ............... | H04L 9/0825 |
| 9,973,481 B1 * | 5/2018 | Sharifi Mehr ........ | H04L 9/0825 |
| 10,116,440 B1 * | 10/2018 | Rudzitis ................ | H04L 9/0891 |
| 10,498,530 B2 * | 12/2019 | Nix ...................... | H04L 63/0435 |
| 10,700,856 B2 * | 6/2020 | Nix ....................... | H04L 9/0841 |
| 2009/0067623 A1 * | 3/2009 | Lei ........................ | H04L 63/083 380/44 |
| 2017/0149740 A1 * | 5/2017 | Mansour ............... | H04L 63/045 |
| 2017/0323114 A1 * | 11/2017 | Egorov ................ | H04L 63/0435 |
| 2018/0167203 A1 * | 6/2018 | Belenko ................... | H04L 9/14 |

(Continued)

FOREIGN PATENT DOCUMENTS

CA 2684229 A1 * 10/2008 ............. H04L 63/06

OTHER PUBLICATIONS

Shriram Rajagopalan; Pico Replication: A High Availability Framework for Middleboxes; ACM-2013; pp. 1-15.*

(Continued)

*Primary Examiner* — Monjur Rahim (74) *Attorney, Agent, or Firm* — Kwan & Olynick LLP (57) ABSTRACT

Disclosed is a highly available distributed key management system (KMS). The system receives a request for an encrypted data encryption key (DEK) from a user at an instance of the KMS. The instance of the KMS generates a blob that is signed with a symmetric key, and negotiated keys based on a key agreement scheme between the instance of the KMS and another instance of the KMS. The negotiation steps are performed using different public/private key pairings, while producing equivalent negotiated keys shared between KMS instances. This blob is sent to the user where it is stored by the user. Subsequently, when the user needs a decrypted DEK, the user may send this blob to any instance of the KMS and obtain a decrypted DEK for use in encrypting user data.

20 Claims, 5 Drawing Sheets

(56) References Cited

U.S. PATENT DOCUMENTS

2019/0238521 A1* 8/2019 Jawaharlal ................ H04L 9/14
2019/0318102 A1* 10/2019 Araya ................... H04L 9/0891
2020/0004982 A1* 1/2020 Mumford .............. H04L 9/0844
2022/0085997 A1* 3/2022 Kusaka ................. H04L 9/3247
2022/0360429 A1* 11/2022 Aronesty ............. H04L 9/0643

OTHER PUBLICATIONS

Wikipedia, "Diffie-Hellman Key Exchange," Sep. 10, 2021, pp. 1-11, [Online] [Retrieved on Jan. 21, 2022] Retrieved from the Internet <URL: https://en.wikipedia.org/wiki/Diffie%E2%80%93Hellman_key_exchange>.

Wikipedia, "Key Exchange," Sep. 27, 2021, pp. 1-5, [Online] [Retrieved on Jan. 21, 2022] Retrieved from the Internet <URL: https://en.wikipedia.org/wiki/Key_exchange>.

* cited by examiner

KEY MANAGEMENT PROVIDING HIGH AVAILABILITY WITHOUT KEY REPLICATION

TECHNICAL FIELD

The disclosure generally relates to the field of management of data encryption keys, and more specifically to ensuring high availability of keys without resorting to key replication in a distributed environment.

BACKGROUND

In order to provide high availability of a service for users, multiple instances of the service may be executing at multiple locations. When a user requests the service at a particular location, and the service is unavailable at the requested location, there is a need for seamless transfer of the request to an instance of the service at another location that will serve the user transparently. In running multiple instances of a service, the data is typically replicated across all the instances. In order to ensure secure data, a well-established practice is to encrypt the data using encryption keys. However, with replicating data across the multiple instances of the service, the encryption keys need to be replicated across the multiple locations. For example, when the service is a data center, and there is replicated data at multiple data centers, replicating many keys across data centers, especially across long distances, offers several challenges, including reliably copying the key related data and keeping them synchronized across the multiple data centers, and maintaining timing and sequence of events when propagating key data. Therefore, it is desirable to have a key management service in distributed environments that addresses these challenges.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "130a," indicates that the text refers specifically to the element having that particular reference numeral. A reference numeral in the text without a following letter, such as "130," refers to any or all of the elements in the figures bearing that reference numeral.

DETAILED DESCRIPTION

In order to provide high availability of a service for users, multiple instances of the service may be executing at multiple locations. Thus, when a user requests the service at a particular location, and the service is unavailable at the requested location, there may be a seamless transfer of the request to an instance of the service at another location that will serve the user transparently. In running multiple instances of a service, often, the data is typically replicated across all the instances. In order to ensure secure data, a well-established practice is to encrypt the data using encryption keys. However, with replicating data across the multiple instances of the service, the encryption keys are often replicated across the multiple locations. For example, when the service is a data center, and there is replicated data at multiple data centers, replicating many keys across data centers, especially across long distances, offers several challenges, including reliably copying the key related data and keeping them synchronized across the multiple data centers, and maintaining timing and sequence of events when propagating key data. Embodiments of the key management system (KMS) described herein address these challenges. The KMS described herein offers high availability by running multiple instances of the system across multiple locations, such as at multiple data centers that may replicate data, while ensuring that there is no replication of data encryption keys. In the description herein, the term "KMS" may be used to refer to the key management system as well as an instance of the key management system.

Embodiments of the KMS described herein have several advantages: The system tolerates complete failure of individual instances of the KMS, by automatically and transparently enabling switch-over to other instances of the KMS. Replication of data encryption keys is avoided. The KMS avoids unnecessary communication by deferring data encryption key exchange until actually needed by the user for data encryption; it is ensured that required information is exchanged between instances in an asynchronous and on-demand manner. The KMS minimizes data encryption key exchange between instances, ensuring security. Furthermore, embodiments of the KMS described herein avoid hard cyclic dependency problems between instances of the KMS that may result from error, failure, or latency-prone key exchanges between them.

In embodiments described herein, the KMS is designed to handle transient errors (e.g., network related errors) transparently and automatically retry various steps upon the occurrence of such errors. In some embodiments, the KMS may leverage DNS round robin, service mesh, and other network related technologies. When an instance of the KMS fails, the system will automatically switch to another instance. Embodiments described herein ensure that a user of the system may pick any instance of the KMS at random at any given time and obtain identical results in terms of the desired service of obtaining a data encryption key for use with the user's data.

Embodiments herein describe a method for obtaining an encrypted data encryption key from an instance of a key management system (KMS). The method involves receiving, at a first instance of a KMS, a request for a data encryption key (DEK) from a user, the first instance of the KMS configured with a first symmetric key, a first public-private key pair that is associated with the first instance of the KMS, and a second public key that is obtained from a different second instance of a KMS system via a key agreement scheme between the first and second instances of the KMS. The method further involves generating, at the first instance of the KMS, the DEK. Subsequently, the method involves generating, at the first instance of the KMS, a blob, where the blob includes; the generated DEK that is subsequently encrypted by the first symmetric key and the generated DEK that is subsequently encrypted by a negotiated key that is generated based on the key agreement scheme. The first instance of the KMS sends the blob to the user.

Embodiments herein also describe a method for obtaining a decrypted DEK from an instance of a KMS. The method involves receiving, at a first instance of a KMS, a request for a DEK from a user, where the first instance of the KMS configured with a first symmetric key, a first public-private key pair that is associated with the first instance of the KMS, and a second public key that is obtained from a different second instance of a KMS system via a key agreement scheme between the first and second instances of the KMS. The received request includes a blob that comprises: the requested DEK that has been previously encrypted with a symmetric key and the requested DEK that has been previously encrypted based on a negotiated key that is generated based on the key agreement scheme. When the first instance of the KMS determines that the blob was previously generated by the second instance of the KMS, the system generates the negotiated key based on the key agreement scheme and performs a decryption of the encrypted DEK in the blob that has been previously encrypted based on the negotiated key using the generated negotiated key to generate the decrypted DEK. The decrypted DEK is sent to the user.

Figure 1:
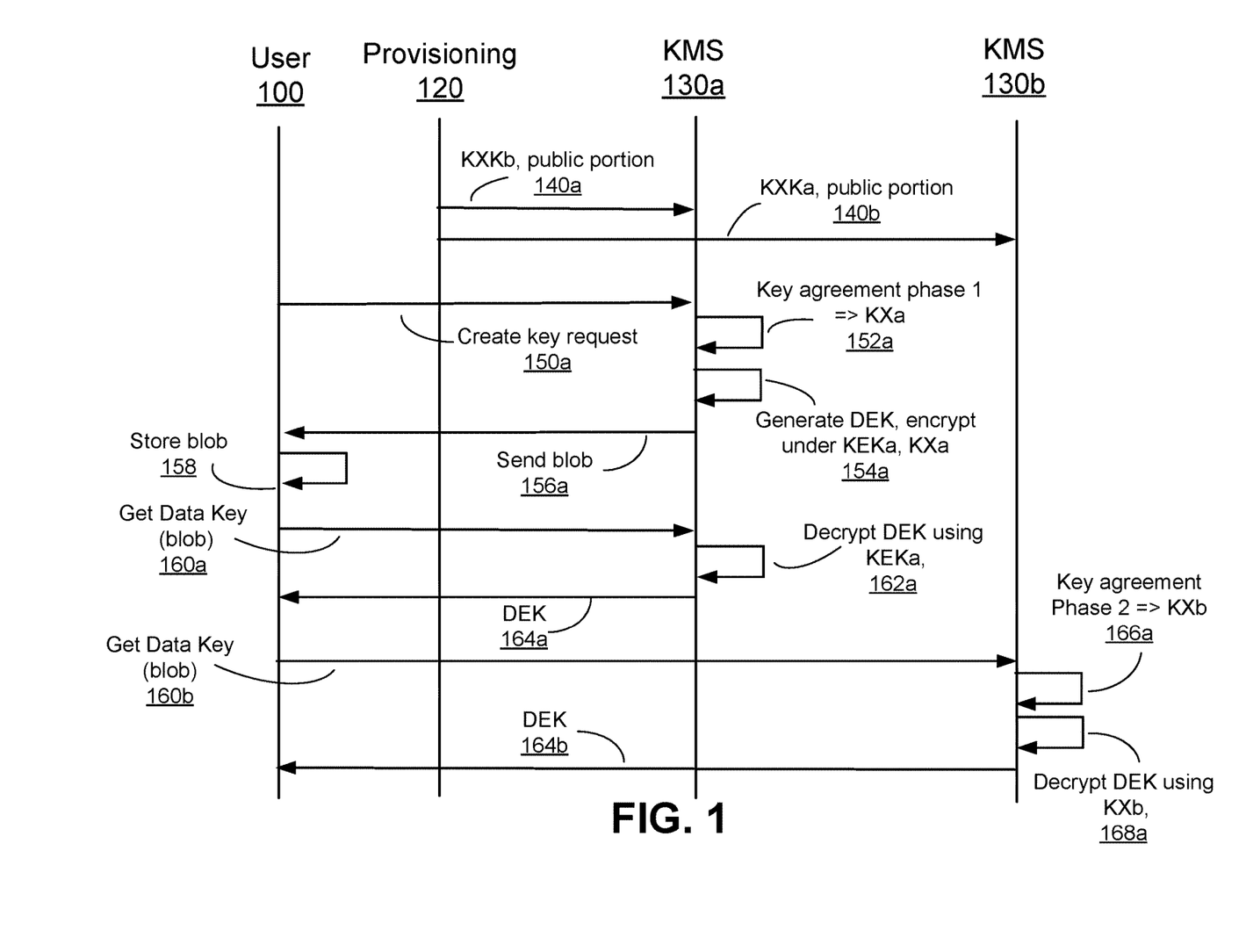
FIG. 1 depicts an example of a use-case workflow using instances of a key management system in a distributed environment while ensuring high availability without key replication, in accordance with some embodiments.
Figure 2:
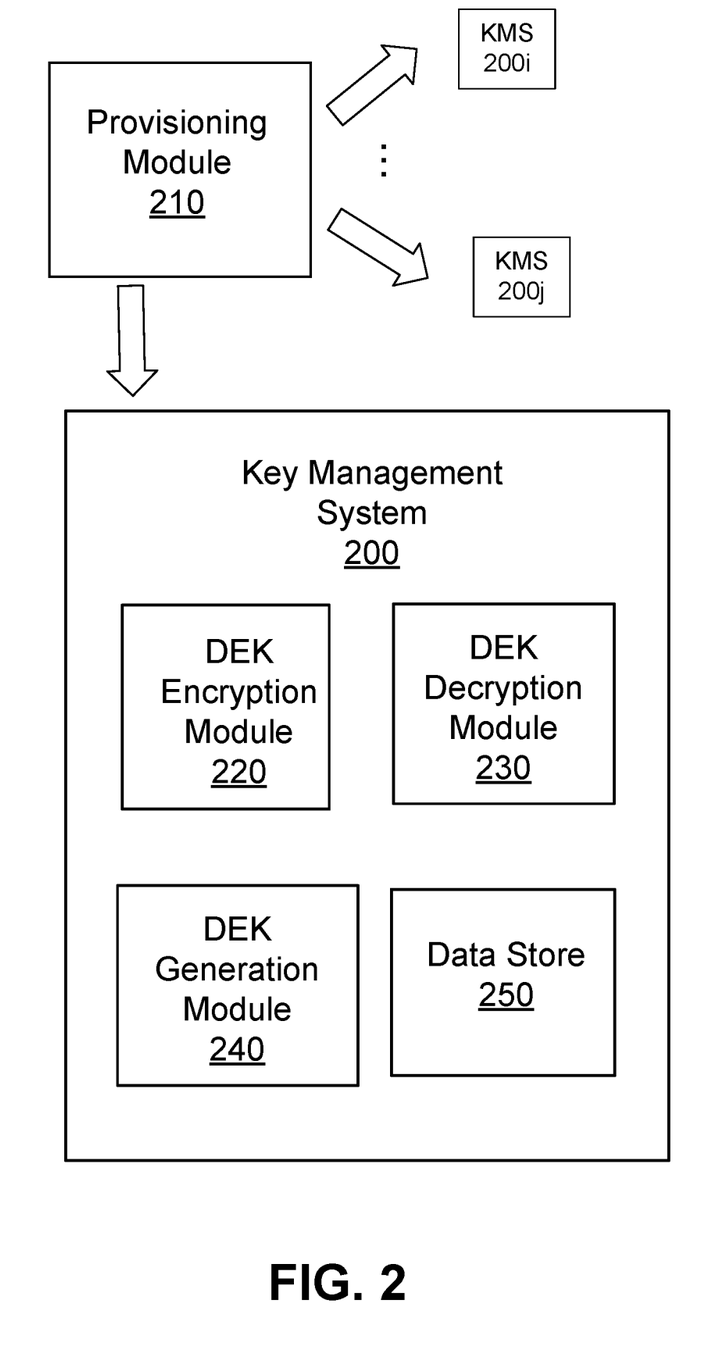
FIG. 2 is a block diagram of an instance of a key management system, in accordance with some embodiments.

FIG. 1 depicts a use-case workflow, in accordance with some embodiments described herein. The example shown in FIG. 1 may be performed in association with instances of the KMS 200 such as depicted in FIG. 2.

FIG. 1 depicts a user 100 interacting with two instances of the KMS, KMS 130a and KMS 130b, according to an embodiment. In addition, a provisioning system 120 is depicted that ensures that the two key management systems KMS 130a and 130b collaborate and share necessary information while operating independently. The provisioning system 120 ensures that both KMS 130a and 130b have a trust relationship established and trust each other's key-exchange-keys. In some embodiments, the provisioning system 120 may be viewed as a backend portion of the key management system that also ensures that KMS 130a and KMS 130b have each issued a public-private key pair following established public-private key cryptography practices and exchanged trusted public keys with each other. Thus, the public key KXKb issued by KMS 130b is sent to KMS 130a and the public key KXKa issued by KMS 130a is sent to KMS 130b. In the use-case workflow described henceforth, it is assumed that the trust relationship between KMS 130a and KMS 130b exists and that the public key exchange has been completed, and that each KMS 130 has the public key for the other instances of the KMS 130. Furthermore, each KMS 130 is configured with its own symmetric key KEK. Thus, KMS 130a is configured with symmetric key KEKa, and KMS 130b is configured with symmetric key KEKb.

Subsequent to the sharing of the public keys KXKa and KXKb, and having an established trust relationship between KMS 130a and KMS 130b, the user 100 may request a data encryption key (DEK) from either of the two instances of the KMS 130. For example, the user 100 sends a create key request 150a to KMS 130a. KMS 130a performs the following steps 155a:

KMS 130a generates a data encryption key DEK.

Based on the established trust relationship between KMS 130a and KMS 130b, and the public key KXKb received at KMS 130a from KMS 130b, KMS 130a performs a first phase of a key agreement and generates 152a a negotiated key KXa.

KMS 130a generates a blob that has the following content: (i) the generated DEK that is further encrypted by KMS 130a's own symmetric key KEKa, (ii) the generated DEK that is further encrypted by the negotiated key KXa, and (iii) metadata.

KMS 130a sends 156a the generated blob to the user 100. The user 100 stores 158 the received blob from KMS 130a. This completes the response to a user's request for a DEK at a KMS 130. Thus, in response to the user 100's request for a DEK, the user 100 does not receive the DEK itself; instead the user 100 receives lthe blob containing encrypted DEKs and associated metadata; and the user stores the received blob.

When user 100 seeks to use a DEK in a saved blob, the user sends a request for the DEK to either of the two KMS 130a/130b; the request from the user 100 is accompanied by the stored blob. The process performed by either KMS 130a/130b in response to the request from user 100 is described below.

When KMS 130a receives 160a the request and stored blob from user 100, KMS 130a uses the metadata in the blob to determine that the blob was generated at KMS 130a. KMS 130a decrypts 162a the encrypted DEK in the blob using its symmetric key KEKa to generate the DEK. KMS 130a sends 165a the generated DEK to the user 100. The response to the request from the user 100 for the DEK is complete.

When KMS 130b receives 160b the request and stored blob from user 100, KMS 130b uses the metadata in the blob to determine that the blob was generated at KMS 130a. KMS 130a 130b proceeds to perform the following steps:

KMS 130b generates 166a a negotiated key KXb between KMS 130a and KMS 130b using the private key of the KMS 130b and the public key of KMS 130a. Note that key agreement is based on the private/public keys, thus completing the second phase of the key agreement process corresponding to the first phase previously initiated by KMS 130a, as described herein. Key derivation step follows the key agreement step.

KMS 130b decrypts 168a the encrypted DEK using the negotiated key KXb to generate the DEK. Note that KXb is equivalent to KXa.

KMS 130b sends 165b the generated DEK to the user 100. The response to the request from the user 100 for the DEK is complete.

While the above use-case workflow example is described for a user interacting with two instances of the key management service 130, i.e., 130a and 130b, there may more than two instances of the key management system 130, 130a, 130b, . . . , 130n, i.e., n instances of the key management system KMS 130, each configured and deployed independently across multiple (n) locations—for example, in association with multiple data centers, each located in geographically different locations, where each key management system 130 is configured and deployed independently, and may fail independently. Assuming that a trusted key agreement scheme exists between a pair of KMS 130*i* and 130*j* (e.g., KMS 130*i* has in its possession a public key of a public-private key pair from KMS 130*j*, and KMS 130*j* has in its possession a public key of a public-private key pair from KMS 130*i*), the use case workflow described above applies here as well. Furthermore, if the request from a user for a DEK along with a blob fails at one KMS instance, the system is designed so that the request may be transferred automatically and transparently to another instance of the KMS 130. Additionally, as long as trusted shared agreements exist between the KMS 130 that encrypts a DEK and generates the corresponding blob for the DEK, and a KMS 130 that receives a request for the DEK from the user along with the blob, the request can be served by the receiving KMS 130, and the decrypted DEK sent to the requesting user.

FIG. 2 is a block diagram illustrating components of a key management system 200 that is provisioned initially by a provisioning module 210, in accordance with some embodiments. Other embodiments may include more or fewer modules than those shown in FIG. 2. Functionality indicated as being performed by a particular module may be performed by other modules than those indicated herein. Furthermore, steps of any processes described herein can be performed in an order different from that illustrated herein. An instance of the KMS 200 may also be each referred to as KMS 200 herein.

The provisioning module 210 performs a setup configuration between various instances of the KMS 200 to establish a trust relationship between them. Thus, the provisioning module 210 configures KMS 200 and other KMS instances, e.g., KMS 200*i*, . . . , 200*j* to trust each other's key-exchange-keys, KXKs (e.g., KXKa and KXKb in FIG. 1). The provisioning module 210 trust configuration may be performed only once between a pair of KMS instances. In some embodiments, the provisioning module 210 performs this configuration when an instance is deployed. In some embodiments, the provisioning module 210 may generate public-private key pairs for each pair of instances. For example, in the use-case scenario described in FIG. 1, the provisioning module 210 may generate a KXK pair for KMS 130*a*: (a, aG), and another KXK pair for KMS 130*b*: (b, bG). In this notation, a represents the private key and aG represents the public key for KMS 130*a*, while b represents the private key and bG represents the public key for KMS 130*b*. An example of such public-private key pairs is the Diffie-Hellman key exchange.

In some embodiments, the provisioning module 210 may ensure that in addition to this, KMS 200 is configured with:
- Its symmetric key, KEK-1 (e.g., KEKa for KMS 130*a* in FIG. 1). Examples of symmetric keys may be the ones used with Advanced Encryption Standard (AES), International Data Encryption Algorithm (IDEA), etc.
- Its own KXK pair, (a, aG)
- The public KXK from other instances (e.g., KMS 130*a* is configured with the public key bG from KMS 130*b* in FIG. 1).

The provisioning module 210 ensures that all instances KMS 200*i* . . . KMS 200*j* that wish to be part of the highly available service are configured correspondingly (i.e, with their own symmetric KEK, their own public-private key pair, and the public keys from the other KMS instances).

Each instance of the KMS 200 may include a DEK encryption module 220, a DEK decryption module 230, a DEK generation module 240, and a data store 250. Other embodiments may include more or fewer modules than those shown as part of KMS 200. Functionality indicated as being performed by a particular module may be performed by other modules than those indicated herein. Furthermore, steps of any processes described herein can be performed in an order different from that illustrated herein.

The DEK encryption module 220 responds to a request from a user for a data encryption key. In response to receiving the request, in some embodiments, the DEK generation module 240 generates a DEK. The DEK generation module 240 may generate a DEK from a trusted entropy source, e.g., a HSM (hardware security module). In some embodiments, the DEK generation module 240 selects a DEK from a preconfigured pool of DEKs. This embodiment includes BYOK ('bring your own key') use cases.

Subsequently, the DEK encryption module 220 encrypts the generated or selected DEK under at least two keys in such a way that either of the at least two keys may be used to decrypt the DEK.

The first key that the DEK encryption module 220 uses to encrypt the DEK is the KMS 200's configured own symmetric key. The encrypted DEK, i.e., DEK1 may be generated by encrypting the DEK with KEK-1. This may be represented notationally as: DEK1=ENCRYPT (KEK-1, DEK)

The other keys that the DEK encryption module 220 uses to encrypt the DEK are negotiation keys that are based on applying key derivation functions (KDF) to the shared agreement established by the provisioning module 210 between the KMS 200 and other KMS instances during the provisioning. For example, in the example in FIG. 1, with KMS 130*a* and KMS 130*b* having a shared agreement, then the second encrypted DEK, i.e., DEK2, may be generated by encrypting DEK with KX1, where KX1 is the negotiated key. The negotiated key is computed using the shared public key from KMS 130*b*, i.e., bG, along with the private key of KMS 130*a*, i.e., a, using a key derivation function KDF, as follows:

KX1=KDF (abG, params), where params are parameters related to the negotiation agreement, such as: output bits, random salt, iterations of a sub-function, contextual information, etc.

The encryption of DEK with the negotiated key may be represented notationally as follows:
DEK2=ENCRYPT (KX1, DEK)

After generating the at least two encrypted DEKs, DEK1 and DEK2, as described above, the DEK encryption module 220 generates a blob of the following form:
blob={DEK1, DEK2, metadata, signature}
The metadata in the blob may store the parameters of the key agreement scheme used to derive the negotiation key, KX1. Note that if the KMS 200 has agreements with a through p instances of the KMSs, the generated blob may be of the form:
blob={DEK1, DEKa, . . . , DEKp, metadata, signaturea, . . . , signaturep}
In some embodiments the blob includes a single signature whereas other embodiments the blob may include more than one signature. Here DEKa, . . . , DEKp represent the DEK encrypted using the negotiated keys for the a through p instances of the KMS. The metadata contains key parameters, including the parameters associated with the various negotiated keys, information related to the time of encryption, the particulars of the keys used, etc. Further, as depicted notationally above, the blob is signed, signaturea, . . . , signature, using keys derived from similarly negotiated keys that are shared between KMS 200 and the other a through p instances of the KMSs.

The DEK encryption module 220 sends the generated blob to the requesting user, for storage at the user's end, as a response to the request for a DEK from the user.

The user stores the received blob until it needs to use the DEK to encrypt data. When the user needs to use the DEK for encryption or decryption, the user sends a request for the DEK to any instance of a KMS, where the request includes the previously received and stored blob.

The DEK decryption module 230 responds to a request from a user for a decrypted DEK, where the request includes a previously generated blob that has been saved by the user. The DEK decryption module 230 validates the blob based on the signature in the blob. Subsequent to validation, there are two possible scenarios addressed by the KMS decryption module 230.

In the first scenario, the blob was generated previously by KMS 200 (i.e., the same KMS received a request from the user for a DEK, generated the blob, sent it to the user for storage, and is now receiving the request to obtain a DEK from the stored blob). In this scenario, the DEK decryption module 230 will decrypt the DEK based on its own symmetric key, KEK1. This may be represented notationally as: DEK=DECRYPT (KEK−1, DEK1)

The DEK is sent to the requesting user for use in encrypting the user's data.

In the second scenario, the blob was previously generating by a different instance of the KMS 200. For example, there may be a switch over from the blob-generating KMS instance to the blob-receiving KMS instance. In this scenario, the DEK decryption module 230 will obtain the negotiated key between KMS 200 and the blob-generating KMS based on the shared agreement established by the provisioning module 210 between the KMS 200 and the blog-generating KMS instance. For example, in the example in FIG. 1, with KMS 130*a* and KMS 130*b* having a shared agreement, If KMS 130*b* receives the request from the user with the blob, the DEK decryption module 230 will obtain the negotiated key KX2 between KMS 130*b* and KMS 130*a*, using a key derivation function KDF, as follows:

KX2=KDF (baG, params), where params are parameters related to the negotiation agreement, such as: output bits, random salt, iterations of a sub-function, contextual information, etc., and the parameters are included in the metadata in the blob.

Here, the negotiated key KX2 is computed using the shared public key from KMS 1300, i.e., aG, along with the private key of KMS 130*b*, i.e., b. The decryption of DEK2 with the negotiated key to obtain DEK may be represented notationally as follows:

DEK=DECRYPT (KX2, DEK2)

Thus, the DEK decryption module 230 will decrypt the encrypted DEK2 based on a second phase of the key agreement previously established between the blob-generating KMS instance and the current KMS 200. The DEK is sent to the requesting user for use in encrypting the user's data.

The data store 250 receives and stores data for use and easy access by modules of the key management system 200. The data store 250 may receive and cache one or more parameters in association with the key agreements between KMS instance 200 and other KMS instances. In some embodiments, the data store 250 will store the received blobs and any associated metadata associated with received blobs. In some embodiments, the data store 250 may store data such as the negotiated keys KX2 associated with various other KMS instances in a cache to improve performance. In some embodiments, the negotiated keys may be generated and stored in the data store 250 when the instances of the KMS begin to operate, and prior to receiving the request for the DEK with the included blob from the user. The data store 250 may store intermediate data for use by the various modules of the key management system 200. The data store 250 is a memory, such as a read only memory (ROM), dynamic random-access memory (DRAM), static random-access memory (SRAM), or some combination thereof.

Overall Process

Figure 3:
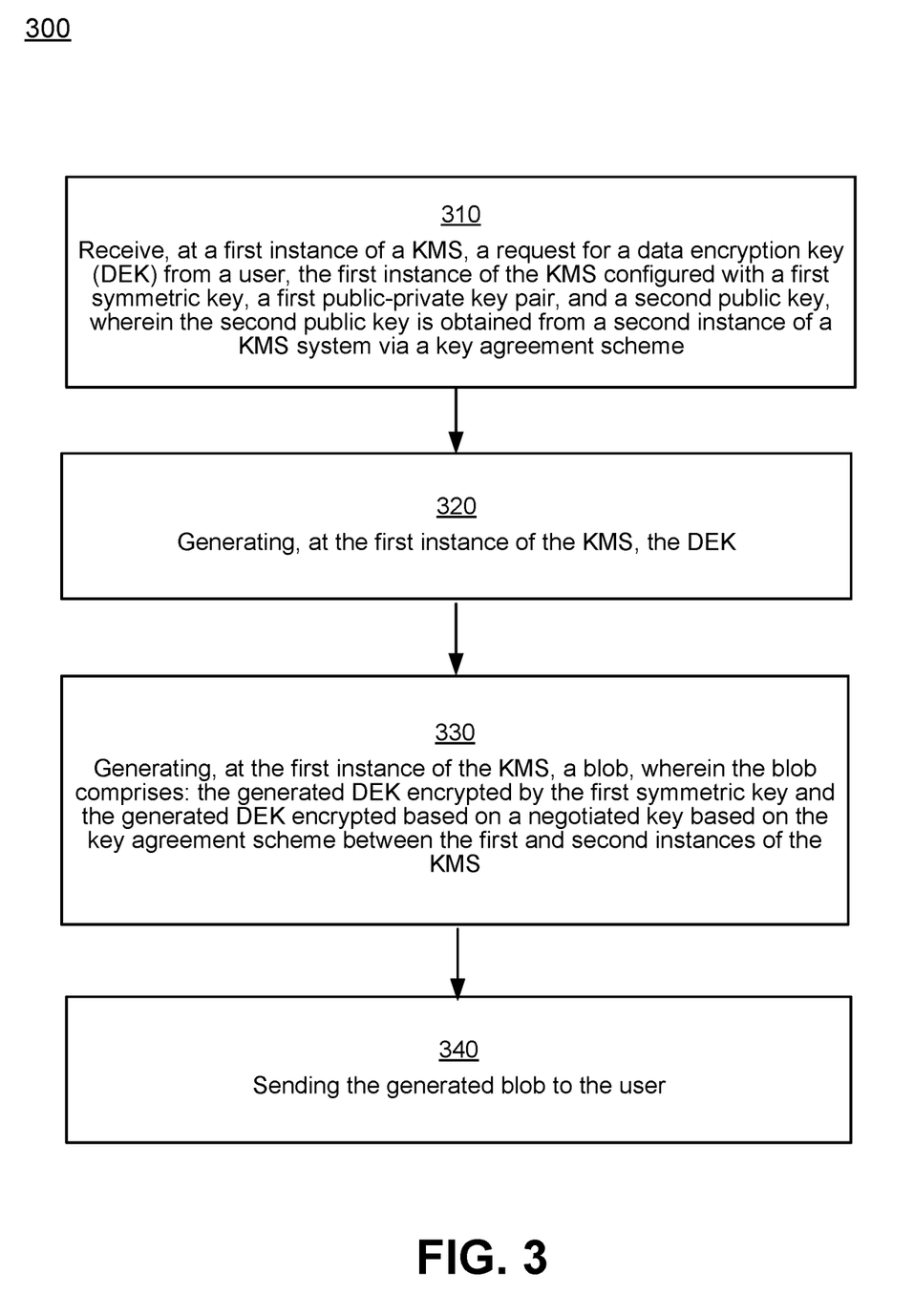
FIG. 3 is a flow chart illustrating the overall process for performing encryption of a data encryption key in a distributed environment, in accordance with some embodiments.

FIG. 3 is a flowchart illustrating an overall process for performing encryption of DEKs, as performed by the key management system 200, according to one embodiment. In this flowchart, it is assumed that an instance of the key management system 200 is executing at a particular location in a distributed environment, such as at a data center. Various embodiments can perform the steps of FIG. 3 in different orders than those indicated herein. Moreover, other embodiments can include different and/or additional steps than the ones described herein.

The key management system 200 that is running as a first instance receives 310 a request for a DEK from a user. The first instance of the system is configured with a first symmetric key, a first public-private key pair, and a second public key, wherein the second public key is obtained from a second instance of the KMS. In some embodiments, the first instance of the system may be configured when the first instance of the KMS begin operating or when the second instance of the KMS begins operating.

The key management system 200 generates 320 the DEK. In some embodiments, the DEK may be generated from a preconfigured pool of DEKs while in other embodiments, the user may actually provide the DEK to the KMS as part of a bring your own encryption (BYOE) approach. In the BYOE case, the user request will be accompanied by the DEK and the instance of the KMS will proceed with the subsequent steps using the BYOE key provided by the user.

The key management system 200 generates 330 a blob. The generated blob comprises: the DEK encrypted by the first symmetric key, as well as the DEK encrypted based on a negotiated key between the first and second instances of the system. If the first instance has key agreement schemes with other instances of the KMS, then the DEK is also encrypted by negotiated keys based on the first instance of the KMS and each of the other instances of the KMS. The generated blob also includes metadata with key parameters including parameters associated with negotiated keys, information related to time, and particulars of the keys that are used, etc. Furthermore, the blob includes signatures based on keys derived from negotiated keys that are shared between KMS 200 and the instances of the KMSs.

The key management system 200 sends 350 the generated blob to the user.

Figure 4:
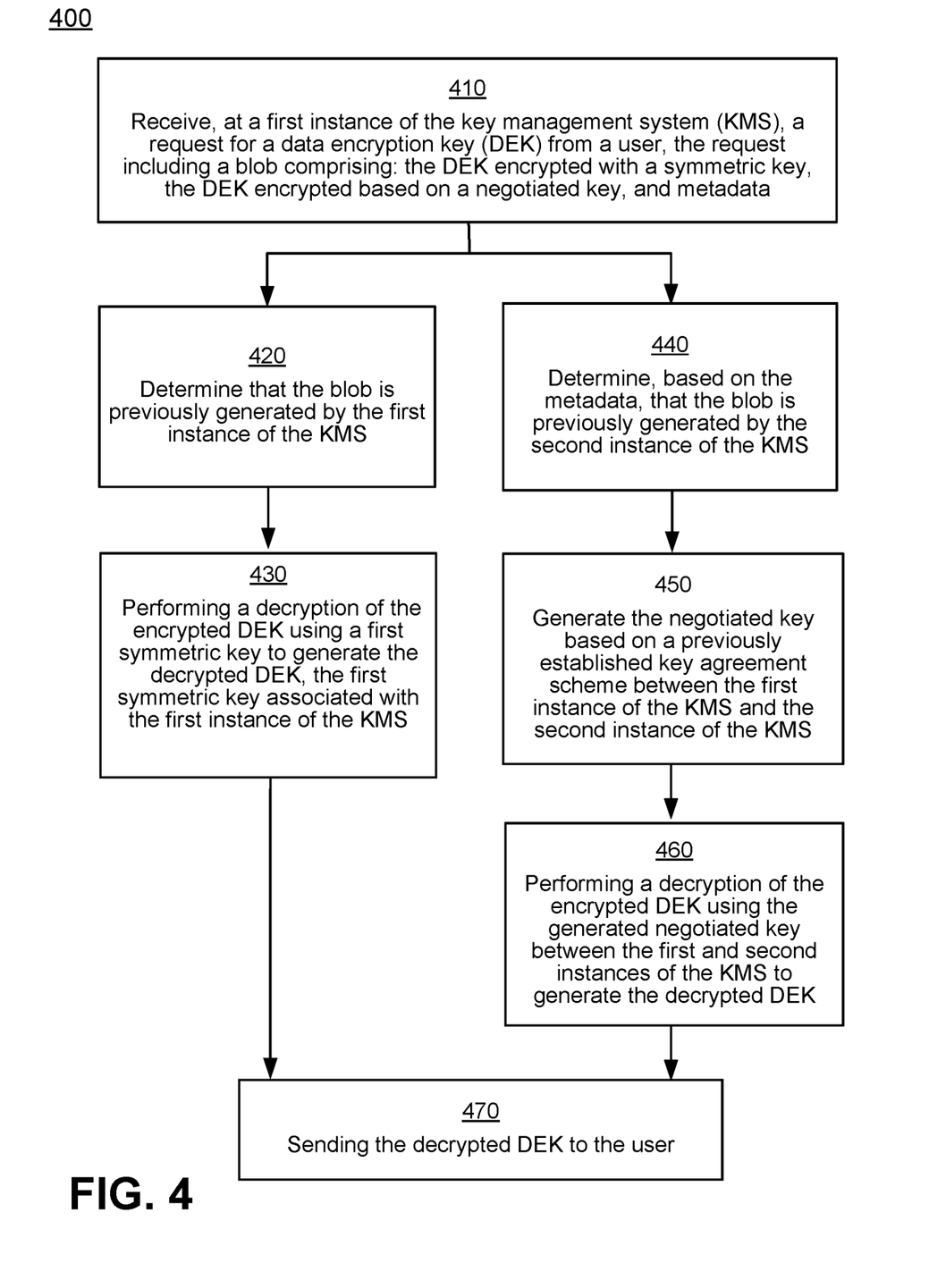
FIG. 4 is a flow chart illustrating the overall process for performing decryption of a data encryption key in a distributed environment, in accordance with some embodiments

FIG. 4 is a flowchart illustrating an overall process for performing decryption of DEKs, as performed by the key management system 200, according to one embodiment. For purposes of clarity, and without loss of generality, it is assumed in this illustrated process that an instance of the key management system 200 is operating as a first instance of the system, where the first instance may be located at the particular location in the distributed environment, such as a data center. Various embodiments can perform the steps of FIG. 4 in different orders than those indicated herein. Moreover, other embodiments can include different and/or additional steps than the ones described herein.

The key management system 200 receives 410 a request for a decrypted DEK from a user. The received request includes with a blob that comprises: the DEK encrypted by a symmetric key, the DEK encrypted based on a negotiated key, and metadata. The blob may also include one or more signatures of corresponding one or more other instances of the KMS that can be validated by the first instance of the KMS.

The key management system 200 determines 420, that the blob is previously generated by the first instance of the system. This determination is based on the first instance of the KMS validating the blob (including the metadata) using a signature of the one or more signatures in the blob that is signed by the first instance of the KMS. The determination is based on the metadata.

The key management system 200 performs 430 a decryption of the encrypted DEK using a first symmetric key to generate the decrypted DEK. Here, the first symmetric key associated with the first instance of the KMS.

The key management system 200 may alternately determine 450 that the blob is previously generated by a second instance of the system 200. For purposes of clarity, and without loss of generality, it is assumed here that an instance of the key management system 200 is operating as a second instance of the system, where the second instance may be located at a different location in the distributed environment than the particular location of the first instance of the system. The determination regarding the KMS that generated the blob received from the user is based on the first instance of the KMS validating the blob using a signature of the one or more signatures in the blob, the validated signature based on a shared agreement between the first and second instances of the KMS. Metadata is used for the determination of the key-issuing KMS instance.

The key management system 200 generates 450 the negotiated key using a key derivation function based on a private key of the second instance of the system and the public key of the first instance of the system.

The key management system 200 performs 460 a decryption of the encrypted DEK using the negotiated key between the first and second instances of the system to generate the decrypted DEK The key management system 200 sends 470 the decrypted DEK to the user.

Computing Machine Architecture

Figure 5:
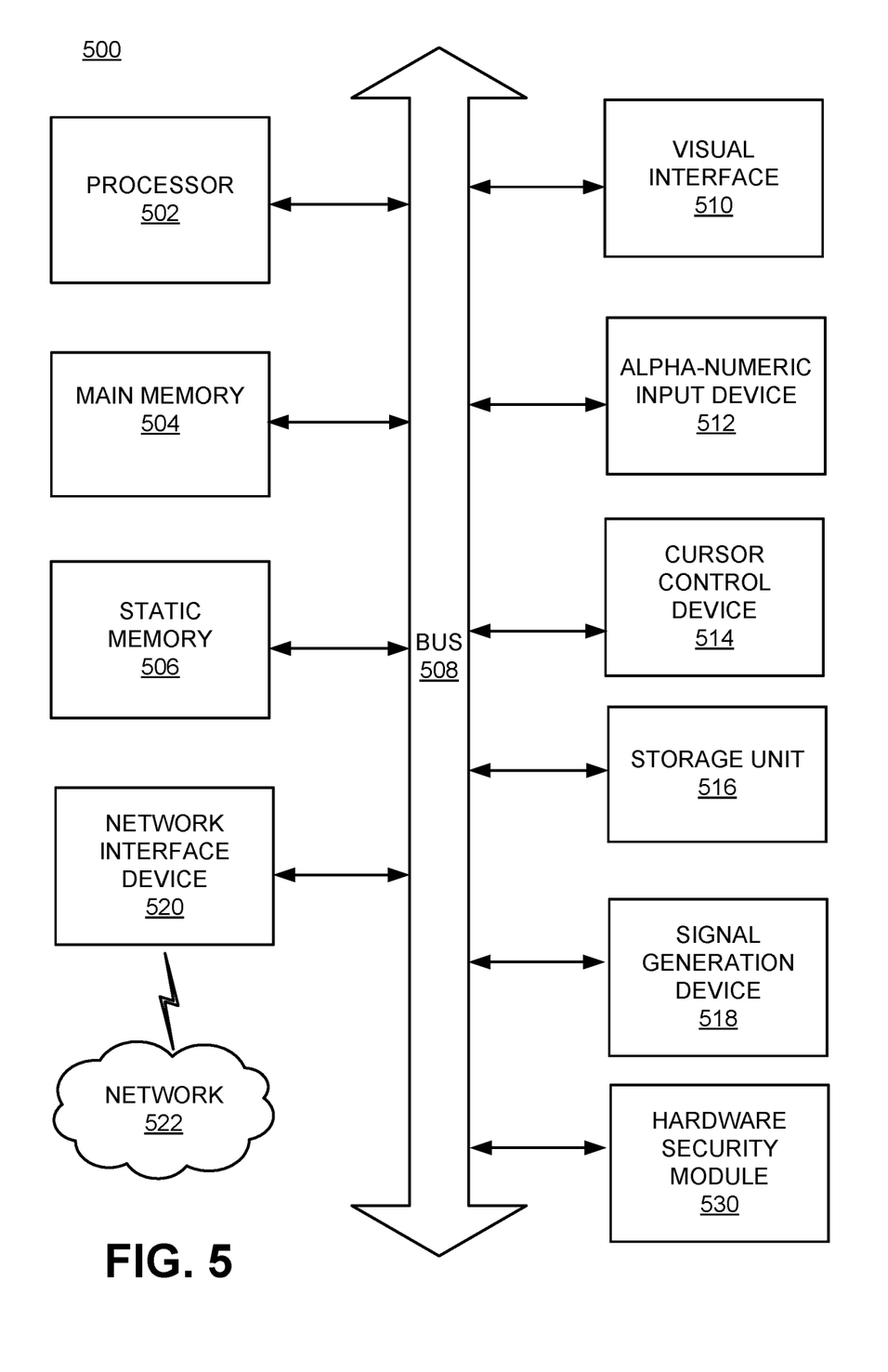
FIG. 5 is a block diagram illustrating the architecture of a typical computer system for use by modules of FIG. 2, in accordance with some embodiments.

The key management system 200 may include one or more components described in FIG. 5. FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute instructions to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 505, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 515 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium on which is stored instructions (e.g., software) embodying any one or more of the methodologies or functions described herein. The instructions (e.g., software) may also reside, completely or at least partially, within the main memory 505 or within the processor 502 (e.g., within a processor's cache memory) during execution thereof by the computer system 500, the main memory 505 and the processor 502 also constituting machine-readable media. The instructions (e.g., software) may be transmitted or received over a network 522 via the network interface device 520.

The term "machine-readable medium" should be taken to include a single medium or multiple media (e.g., a centralized or distributed database, or associated caches and servers) able to store instructions. The term "machine-readable medium" shall also be taken to include any medium that is capable of storing instructions for execution by the machine and that cause the machine to perform any one or more of the methodologies disclosed herein. The term "machine-readable medium" includes, but not be limited to, data repositories in the form of solid-state memories, optical media, and magnetic media.

In some embodiments, the computer 500 includes a hardware security module 530 (HSM), which is a storage designed for storing keys. The HSM safeguards and manages digital keys, performs encryption and decryption functions for digital signatures, strong authentication and other cryptographic functions.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for inserting media content into copy space available on an image. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for obtaining an encrypted data encryption key from an instance of a key management system (KMS), the method comprising:
   receiving, at a first instance of a KMS, a request for a data encryption key (DEK) from a user, the first instance of the KMS configured with a first symmetric key, a first public-private key pair that is associated with the first instance of the KMS, and a second public key that is obtained from a different second instance of a KMS system to be used in a key agreement scheme between the first and second instances of the KMS;
   generating, at the first instance of the KMS, the DEK;
   generating, at the first instance of the KMS, a blob, wherein the blob comprises:
      a first instance of the generated DEK that is subsequently encrypted by the first symmetric key, and
      a second instance of the generated DEK that is subsequently encrypted by a negotiated key that is generated based on the key agreement scheme; and
      sending the blob to the user, wherein the first instance of the KMS is configured to decrypt the first instance of the generated DEK and the second instance of the KMS is configured to decrypt the second instance of the DEK.

2. The method of claim 1, wherein generating the negotiated key comprises using the key agreement scheme, applied to at least the private key of the first public-private key pair and the second public key, and a key derivative function (KDF).

3. The method of claim 1, wherein the negotiated key is generated prior to receiving the request for the DEK from the user.

4. The method of claim 3, wherein the negotiated key:
   is stored in a cache associated with the first instance of the KMS; and
   retrieved from the cache after receiving the request for the DEK from the user.

5. The method of claim 1, wherein the negotiated key is generated after receiving the request for the DEK from the user.

6. The method of claim 1, wherein the generated blob further comprises:
   one or more signatures of the first instance of the KMS that can be validated by other corresponding one or more other instances of the KMS, the one or more other instances of the KMS including the second instance of the KMS; and
   metadata.

7. The method of claim 6, wherein the signature of the first instance of the KMS that can be validated by the second instance of the KMS is based on a public key, or a negotiated key generated by the key agreement scheme between the first and second instances of the KMS.

8. The method of claim 6, wherein the metadata comprises one or more parameters that are related to the key agreement scheme, and wherein the one or parameters are used to generate the negotiated key.

9. A computer implemented method for obtaining a decrypted data encryption key from an instance of a key management system (KMS), the method comprising:
   receiving, at a first instance of a KMS, a request for a data encryption key (DEK) from a user, the first instance of the KMS configured with a first symmetric key, a first public-private key pair that is associated with the first instance of the KMS, and a second public key that is obtained from a different second instance of a KMS system via a key agreement scheme between the first and second instances of the KMS, the request including a blob, the blob comprising:
   a first instance of the DEK that has been previously encrypted with a symmetric key; and
   a second instance of the DEK that has been previously encrypted based on a negotiated key that is generated based on the key agreement scheme; and
   metadata;
in response to determining that the blob was previously generated by the second instance of the KMS,
   generating the negotiated key based on the key agreement scheme; and
   performing a decryption of the second instance of the DEK that has been previously encrypted based on the negotiated key using the generated negotiated key to generate the decrypted DEK; and
sending the decrypted DEK to the user.

10. The method of claim 9, further comprising:
in response to determining that the blob was previously generated by the first instance of the KMS, performing a decryption of the first instance of the DEK that has been previously encrypted with the symmetric key by using the first symmetric key to generate the decrypted DEK; and
sending the decrypted DEK to the user.

11. The method of claim 9, wherein the blob further comprises one or more signatures of corresponding one or more instances of the KMS that can be validated by the first instance of the KMS.

12. The method of claim 11, wherein determining that the blob was previously generated by the second instance of the KMS is based on the first instance of the KMS validating a signature of the one or more signatures in the blob, the validated signature based on a public key cryptography or a key agreement protocol between the first and second instances of the KMS.

13. The method of claim 11, wherein determining that the blob was previously generated by the first instance of the KMS is based on the first instance of the KMS validating a signature of the one or more signatures in the blob that is signed by the first instance of the KMS.

14. The method of claim 9, wherein generating the negotiated key comprises using a key derivative function (KDF) based on the key agreement scheme, wherein the key agreement scheme uses the private and public keys to obtain the negotiated key, the method further comprising, applying the KDF to the negotiated key to produce the shared key.

15. The method of claim 9, wherein the negotiated key is generated prior to receiving the request for the DEK with the included blob from the user.

16. The method of claim 15, wherein the negotiated key:
is stored in a cache associated with the first instance of the KMS; and
retrieved from the cache after receiving the request for the DEK with the included blob from the user.

17. The method of claim 9, wherein the negotiated key is generated after receiving the request for the DEK with the included blob from the user.

18. A non-transitory computer readable storage medium for storing instructions that when executed by a computer processor cause the computer processor to perform steps for obtaining an encrypted data encryption key from an instance of a key management system (KMS), the steps comprising:
receiving, at a first instance of a KMS, a request for a data encryption key (DEK) from a user, the first instance of the KMS configured with a first symmetric key, a first public-private key pair that is associated with the first instance of the KMS, and a second public key that is obtained from a different second instance of a KMS system to be used in a key agreement scheme between the first and second instances of the KMS;
generating, at the first instance of the KMS, the DEK;
generating, at the first instance of the KMS, a blob, wherein the blob comprises:
   a first instance of the generated DEK that is subsequently encrypted by the first symmetric key, and
   a second instance of the generated DEK that is subsequently encrypted by a negotiated key that is generated based on the key agreement scheme; and
sending the blob to the user, wherein the first instance of the KMS is configured to decrypt the first instance of the generated DEK and the second instance of the KMS is configured to decrypt the second instance of the DEK.

19. The non-transitory computer readable storage medium of claim 18, wherein the blob further comprises one or more signatures of corresponding one or more instances of the KMS that can be validated by the first instance of the KMS.

20. A non-transitory computer readable storage medium for storing instructions that when executed by a computer processor cause the computer processor to perform steps for obtaining a decrypted data encryption key from an instance of a key management system (KMS), the steps comprising:
receiving, at a first instance of a KMS, a request for a data encryption key (DEK) from a user, the first instance of the KMS configured with a first symmetric key, a first public-private key pair that is associated with the first instance of the KMS, and a second public key that is obtained from a different second instance of a KMS system via a key agreement scheme between the first and second instances of the KMS, the request including a blob, the blob comprising:
   a first instance of the DEK that has been previously encrypted with a symmetric key; and
   a second instance of the DEK that has been previously encrypted based on a negotiated key that is generated based on the key agreement scheme; and
   metadata;
in response to determining that the blob was previously generated by the second instance of the KMS,
   generating the negotiated key based on the key agreement scheme; and
   performing a decryption of the second instance of the DEK that has been previously encrypted based on the negotiated key using the generated negotiated key to generate the decrypted DEK; and
sending the decrypted DEK to the user.

* * * * *